United States Patent
Clayton, Jr.

(10) Patent No.: US 9,890,682 B2
(45) Date of Patent: Feb. 13, 2018

(54) SYSTEM, APPARATUS, AND METHOD TO ADDRESS UNWANTED DEF-BASED DEPOSITS IN DIESEL EXHAUST SYSTEM

(71) Applicant: Caterpillar Inc., Peoria, IL (US)

(72) Inventor: Robert D. Clayton, Jr., Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 15/094,709

(22) Filed: Apr. 8, 2016

(65) Prior Publication Data

US 2017/0292430 A1   Oct. 12, 2017

(51) Int. Cl.

| F01N 3/00 | (2006.01) |
|---|---|
| F01N 9/00 | (2006.01) |
| F01N 3/20 | (2006.01) |
| F01N 3/28 | (2006.01) |
| B01D 53/94 | (2006.01) |

(52) U.S. Cl.
CPC ........... *F01N 9/00* (2013.01); *B01D 53/9431* (2013.01); *B01D 53/9495* (2013.01); *F01N 3/206* (2013.01); *F01N 3/2892* (2013.01); *F01N 2610/02* (2013.01); *F01N 2610/10* (2013.01); *F01N 2900/1806* (2013.01)

(58) Field of Classification Search
USPC .......... 60/274, 286, 295, 297, 301, 303, 324
See application file for complete search history.

(56) References Cited

U.S. PATENT DOCUMENTS

| 7,849,676 B2* | 12/2010 | Witte-Merl ........... F01N 3/2066 60/274 |
|---|---|---|
| 7,963,104 B2 | 6/2011 | Girard et al. |
| 8,114,364 B2 | 2/2012 | Harinath et al. |
| 8,176,731 B2* | 5/2012 | Doring ............... B01D 53/9477 60/297 |
| 8,281,573 B2* | 10/2012 | Bruck .................... B01B 1/005 422/173 |
| 8,359,832 B2* | 1/2013 | Yi ....................... B01F 3/04049 422/172 |
| 8,726,640 B2* | 5/2014 | Tilinski ................. F01N 3/2066 60/286 |
| 8,875,499 B2* | 11/2014 | Kawada ................ F01N 3/2066 60/286 |
| 2001/0030350 A1 | 10/2001 | Oowaki et al. |
| 2014/0075925 A1 | 3/2014 | Calvo |

FOREIGN PATENT DOCUMENTS

WO   WO 2005/025725 A1   3/2005

* cited by examiner

*Primary Examiner* — Binh Q Tran
(74) *Attorney, Agent, or Firm* — Oblon, McClelland, Maier & Neustadt

(57) ABSTRACT

An exhaust system for a diesel engine is provided. The exhaust system includes a component body with a surface, and a surface treatment disposed on some of the surface or all of the surface. The surface treatment is disposed so as to receive Diesel Exhaust Fluid (DEF) injected into the exhaust system during operation of the diesel engine. The surface treatment facilitates increased heat transfer to the received DEF to promote water evaporation and urea thermolysis of the received DEF.

13 Claims, 8 Drawing Sheets

SYSTEM, APPARATUS, AND METHOD TO ADDRESS UNWANTED DEF-BASED DEPOSITS IN DIESEL EXHAUST SYSTEM

TECHNICAL FIELD

The present disclosure relates to an exhaust system associated with engines, particularly diesel engines, but also engines of other fuel types, such as dual fuel engines and natural gas engines.

BACKGROUND

Diesel engines, like most engines, can require compliance with a variety of emission standards. In order to meet emission standards, the exhaust gases exiting the diesel engine can be treated by a variety of treatments to remove or minimize unwanted aspects. An exhaust system is generally associated with a diesel engine system for treating exhaust gases to meet emission standards.

Exhaust systems for diesel engines can treat and reduce oxides of nitrogen ($NO_x$) present in exhaust gas flow, prior to the exhaust gas flow exiting into the atmosphere. For example, an aqueous urea solution made from certain percentages of urea and deionized water, such as Diesel Exhaust Fluid (DEF) (e.g., 32.5% urea and 67.5% deionized water), collectively now DEF, can be injected into exhaust gases as the exhaust gases flow through a portion of the diesel exhaust system to reduce $NO_x$ emissions. Water from the DEF typically evaporates first, then the urea undergoes a thermolysis process where it breaks down to isocyanic acid (HNCO) and ammonia. The HNCO can react with water to form another $NH_3$ (and carbon dioxide, $CO_2$). However, once the water evaporates the urea can react with itself and HNCO to form unwanted byproducts, such as biuret. The biuret can further react to produce cyanuric acid, ammelide, and ammeline, which may deposit in the diesel engine exhaust system. The rate of DEF-based deposit formation is a function of the time urea is in contact with itself and HNCO, which is dependent on the exhaust temperature and flow rate, DEF dosing rate, etc.

Thus, injection of DEF can form a film on surfaces of the diesel engine exhaust system that, if not suitably removed, can lead to unwanted deposit formations at various portions of the exhaust system. The unwanted deposit formations can be difficult to remove and can also lead to reduction in fuel efficiency, filter failure, damage or blockage to an SCR catalyst, and excessive back pressure, for instance. Additionally, the DEF can form a film in or on a hydrolysis catalyst, if such a catalyst is employed in the exhaust system, causing accumulation of urea, which can adversely impact DEF dosing control.

One way to reduce unwanted deposit formations is to increase temperature of the exhaust gases, for instance, at a location where the DEF is injected. For example, a Continuous Regeneration System (CRS) can be used to increase exhaust temperature. Another way to increase exhaust temperature is to perform an in-cylinder injection of diesel fuel at the end of each combustion cycle. However, such methods can increase fuel consumption or are impractical. Another way to reduce deposit risk is by way of a hydrolysis catalyst. However, as noted above, DEF can form a film in or on the hydrolysis catalyst causing accumulation of urea, which can adversely affect DEF dosing control.

U.S. Patent Publication Number 2011/0030350 (hereinafter "the '350 publication") describes an exhaust gas purification apparatus having an oxidation catalyst layer that supports on a downstream end surface thereof a hydrophilic layer having a hydrophilic function and forming a urea decomposition accelerator. According to the '350 publication, the hydrophilic layer is formed by coating the end surface of the oxidation catalyst with a catalytic material that has a hydrolytic catalytic function for accelerating the hydrolysis and a hydrophilic function. The '350 publication also describes injecting urea water toward a downstream surface of the hydrophilic layer.

SUMMARY OF THE DISCLOSURE

In one aspect of the present disclosure, an exhaust system for a diesel engine is provided. The exhaust system includes a mixer conduit having a body with an inner surface and an outer surface, a mixer arranged inside the mixer conduit having a front surface and a rear surface, a Diesel Exhaust Fluid (DEF) injection port configured to inject DEF into the mixer conduit upstream of the mixer with respect to an exhaust gas flow direction, a first coating layer disposed on a first pre-set area of the inner surface of the mixer conduit, and control circuitry configured to control DEF injection. The mixer conduit is configured to receive exhaust gases from the diesel engine and DEF from the DEF injection port. The first pre-set area of the inner surface is disposed at a first predetermined location where droplets of injected DEF are anticipated to impact the first coating layer. Also, the first coating layer is of a material different from a material of the inner surface of the mixer conduit and is configured to facilitate water evaporation and urea thermolysis of an impacting DEF droplet. The water evaporation and urea thermolysis is performed without the control circuitry causing an increase in exhaust temperature at the first predetermined location.

In another aspect of the present disclosure, a method is provided. The method includes providing an exhaust component of a diesel exhaust system. The exhaust component has a surface configured to contact exhaust gas flowing in the diesel exhaust system and an aqueous urea solution introduced into the diesel exhaust system. The method also includes providing an increased heat transferring structure on a portion of the surface of the exhaust component. The increased heat transferring structure is configured to receive a portion of the aqueous urea solution introduced into the diesel exhaust system. Further, the increased heat transferring structure facilitates heat transfer to the portion of the aqueous urea solution to increase the rate of water evaporation and urea thermolysis of the received portion of the aqueous urea solution.

In yet another aspect of the present disclosure, a component of a diesel exhaust system is provided. The component includes a metallic body having a surface, and a washcoat disposed over a predetermined portion of the surface of the metallic body. The washcoat is configured to form a contact surface area to receive Diesel Exhaust Fluid (DEF) and exhaust gas provided in a primary flow direction of the diesel exhaust system during operation of a diesel engine. The washcoat facilitates heat transfer to the received DEF to promote water evaporation and urea thermolysis of the received DEF.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
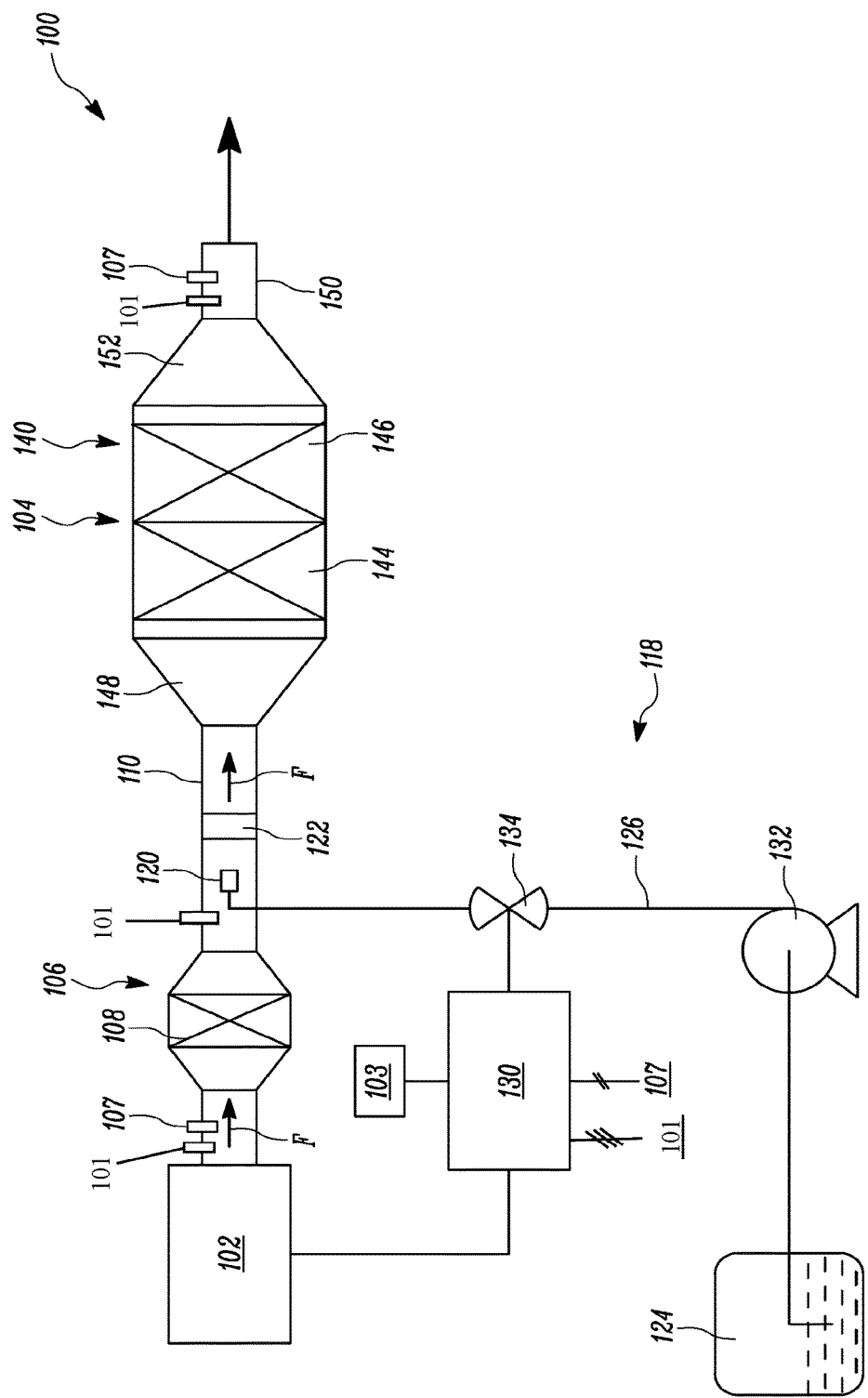
FIG. 1 is a schematic representation of an example of a diesel engine exhaust system, according to one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations or functions as described herein, and likewise do not necessarily limit embodiments of the described subject matter to any particular configuration, orientation, or sequence of functions or operations.

Generally speaking, embodiments of the described subject matter relate to providing increased heat transfer properties, such as increased thermal conductivity and increased heat transfer rates, to enhance DEF deposit robustness. More particular, embodiments of the present disclosure can increase heat transferred to DEF received on a surface or surfaces of an exhaust system, a diesel exhaust system, for instance, to increase a rate of boiling of the received DEF, by way of modification of the geometry of the DEF on the surface and/or by way of providing or facilitating elevated temperatures at the surface where the DEF is located, to reduce a volume or size of the received DEF, ultimately to reduce or eliminate unwanted deposit formation in the exhaust system.

FIG. 1 illustrates a block diagram of diesel engine system 100. The engine system 100 includes a diesel engine 102. The engine 102 may include other components (not shown) such as a fuel system, an intake system, etc. The engine 102 may be used to power a machine including, but not limited to, an on-highway truck, an off-highway truck, an earth moving machine, an electrical generator, etc. Also, as noted above, other exhaust systems may be implemented according to various embodiments of the disclosed subject matter, including, but not limited to, exhaust systems for dual fuel engines and natural gas engines. Thus, providing increased transfer properties, such as increased thermal conductivity, according to various embodiments of the disclosed subject matter can reduce, eliminate or prevent unwanted deposits in exhaust systems other than strictly diesel exhaust systems, including, as noted above, dual fuel engines and natural gas engines.

The engine system 100 includes a diesel exhaust system 104. The exhaust system 104 is in fluid communication with an exhaust manifold (not expressly shown) of the engine 102. The exhaust system 104 can receive and treat exhaust gases exiting from the exhaust manifold of the engine 102 in an exhaust gas flow direction 'F.' In one example, the exhaust gases can be at a temperature that is 250 degrees Celsius or less. The exhaust gases contain emission compounds that may include one or more Nitrogen Oxides ($NO_x$), unburned hydrocarbons (UHC), particulate matter (PM), and/or other combustion products known in the art. Generally speaking, the exhaust system 104 may trap and/or convert $NO_x$, UHC, PM, or its combinations, or other combustion products in the exhaust gases before exiting the engine system 100.

Optionally, the exhaust system 104 includes a first treatment module 106. The first treatment module 106 is positioned downstream of the engine 102, with respect to the exhaust gas flow direction F. The first treatment module 106 can include an oxidation catalyst 108. The oxidation catalyst 108 can remove amounts of hydrocarbons (HC) and carbon monoxide (CO) from the exhaust gases, and promotes the formation of Nitrogen Dioxide ($NO_2$) that reacts more readily with soot to form $CO_2$ and ammonia ($NH_3$) to form Nitrogen ($N_2$), than NO.

The exhaust system 104 also includes a conduit 110, which may be a mixer conduit, or have a portion thereof that houses a mixer. The mixer conduit 110 can be positioned downstream of the first treatment module 106, with respect to the exhaust gas flow direction F. The mixer conduit 110 includes a body 112 (shown in FIG. 3) having an inner surface 114 (shown in FIG. 3) and an outer surface 116 (shown in FIG. 3). In one example, the mixer conduit 110 is formed of a metallic body. Further, the mixer conduit 110 may be embodied as a pipe having a circular cross-section. However, parameters related to the mixer conduit 110 such as size, shape, and material may vary, according to system engineering requirements.

The exhaust system 104 can also include control circuitry 118 that controls injection of a reductant into the exhaust gases. The reductant may be a fluid, such as Diesel Exhaust Fluid (DEF). The reductant may include urea, ammonia, or other reducing agents known in the art. The reductant may be hereinafter interchangeably referred to as "DEF" or "aqueous urea solution," without limiting the scope of the present disclosure.

The control circuitry 118 can include a DEF injection port 120 that injects DEF into the mixer conduit 110 upstream of a mixer 122, with respect to the exhaust gas flow direction F. Thus, the mixer conduit 110 receives exhaust gases from the engine 102, either directly or indirectly, and the DEF from the DEF injection port 120, either directly or indirectly.

Referring to FIG. 1, the control circuitry 118 can also include a DEF tank 124 configured to contain an amount of DEF. Parameters related to the DEF tank 124 such as size, shape, location, and material may vary according to system engineering requirements. A supply conduit 126 provides fluid communication between the DEF tank 124 and the DEF injection port 120. That is, DEF drawn from the DEF tank 124 is delivered to the DEF injection port 120 via the supply conduit 126, for instance. Further, the DEF injection port 120 may be communicably coupled to a control unit 130. Based on control signals received from the control unit 130, DEF from the DEF tank 124 can be provided to the DEF injection port 120 using a pump unit 132, for instance. The control circuitry 118 may also include a DEF valve 134, which can be used to control or meter an amount of DEF flowing therethrough based on the control signals received from the control unit 130. The amount of DEF to be injected into the mixer conduit 110 may be appropriately metered based on engine operating conditions. Optionally, one or more $NO_x$ sensors 107 may be provided, which can provide signals to the control unit 130 for feed-forward and/or feed-back control, for instance, of the DEF dosing by way of DEF injection port 120. A throttle position (TP) sensor 103 may also be provided and can provide signals to the control unit 130 for feed-back control, for instance, of the DEF dosing by way of DEF injection port 120. Additionally, one or more temperature sensors 101 and engine maps may be provided to sense exhaust gas temperature at one or more portions of the exhaust system 104 to provide control information to the control unit 130.

As DEF is introduced to (e.g., injected into) the mixer conduit 110, the DEF can mix with exhaust gases flowing through the mixer conduit 110. In an effort to create uniform flow distribution and promote mixing of the DEF with the exhaust gases, a mixer 122 can be installed within the mixer conduit 110. The mixer 122 can be positioned downstream of a DEF injection location. Incidentally, the term "injection location" used herein can refer to a position in a conduit, such as the mixer conduit 110, at which the DEF injection port 120 injects the DEF. However, DEF can be injected with and/or against the gas flow direction F according to one or more embodiments of the present disclosure.

The mixer conduit 110 may include a single mixer or a number of mixers. In FIG. 1, a single mixer 122 is disposed within the mixer conduit 110. Furthermore, the mixer 122 may embody any one or combination of a flapper style mixer, a swirl mixer, a flow convergent mixer, and an impingement mixer, an impact mixer, without limiting the scope of the present disclosure.

Optionally, the mixer conduit 110 fluidly couples the first treatment module 106 with a second treatment module 140, such that exhaust gases (which may still include DEF droplets) passing through the mixer conduit 110 are carried to the second treatment module 140. The second treatment module 140 can include one or more catalysts. In FIG. 1, the second treatment module 140 includes two catalysts, namely, a Selective Catalytic Reduction (SCR) catalyst 144 and an oxidation catalyst 146. The mixer conduit 110 is in fluid communication with the second treatment module 140 via a first frusto-conical tube 148, for instance.

Exhaust gases can exit the mixer conduit 110 and enter the SCR catalyst 144 positioned downstream of the hydrolysis catalyst 142, with respect to the exhaust gas flow direction F. The SCR catalyst 144 can reduce a concentration of NOx in the exhaust gases. Further, the SCR catalyst 144 can facilitate reaction, reduction, or removal of NOx from the exhaust gases passing through the SCR catalyst 144. The SCR catalyst 144 may have a honeycomb or other structure made from or coated with an appropriate material. The material may be a zeolite an oxide, such as vanadium oxide or tungsten oxide, coated on an appropriate substrate, such as cordierite. The SCR catalyst 144 may have a monolithic structure and may include multiple banks.

The oxidation catalyst 146 is positioned downstream of the SCR catalyst 144, with respect to the exhaust gas flow direction F. In one example, the oxidation catalyst 146 is embodied as an $NH_3$ oxidation catalyst. The oxidation catalyst 146 can oxidize $NH_3$ to $N_2$. In one example, platinum, palladium, silver, iron, copper, nickel, gold, or the like may be employed as the material of the oxidation catalyst 146. Further, the exhaust system 104 may also include a diesel particulate filter (not shown).

Exhaust gases exiting the oxidation catalyst 146 can be provided to the atmosphere via a stack 150. The stack 150 can be in fluid communication with the oxidation catalyst 146 via a second frusto-conical tube 152, for instance.

The exhaust system 104 is provided as a non-limiting example. It will be appreciated that the exhaust system 104 may be disposed in various arrangements and/or combinations relative to the exhaust manifold. These and other variations in exhaust system configuration are possible without deviating from the scope of the disclosure.

Figure 2:
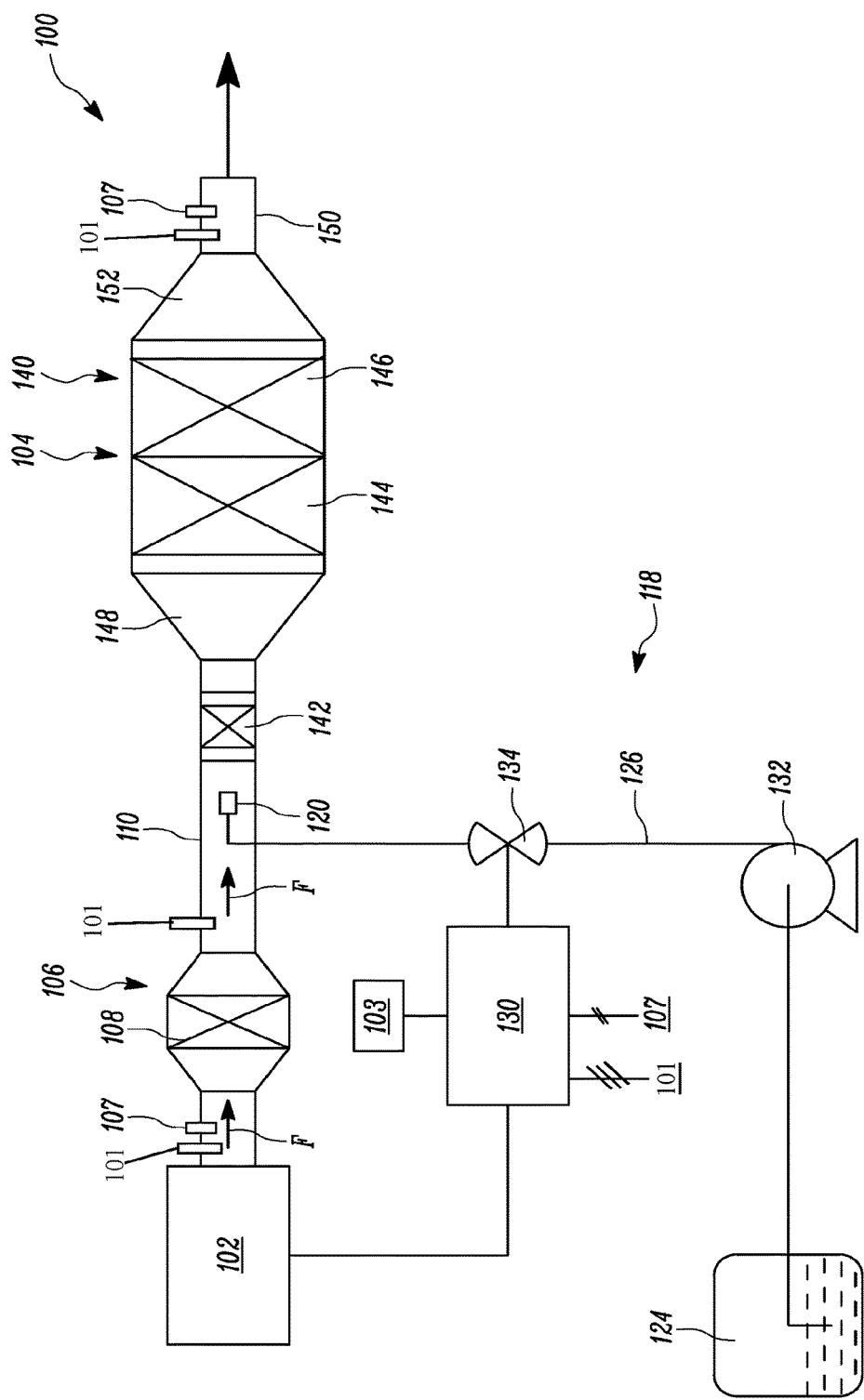
FIG. 2 is a schematic representation of an example of a diesel engine exhaust system, according to one or more embodiments of the present disclosure.

For example, FIG. 2 shows, schematically, an embodiment where a hydrolysis catalyst 142, rather than a mixer, is provided in conduit 110. The hydrolysis catalyst 142 can provide for conversion of urea (or isocyanic acid) into ammonia. More specifically, the hydrolysis catalyst 142 can include, or is coated/impregnated with, an agent that catalyzes the hydrolysis of HNCO to ammonia. Thus, the hydrolysis catalyst 142 can promote the reaction of HNCO with water to form ammonia and $CO_2$, thereby helping to assure the availability of ammonia in the exhaust gases prior to entering the SCR catalyst 144.

In one or more embodiments, the exhaust system 104 may include a substrate 601 (shown in FIGS. 6 and 7) that replaces the hydrolysis catalyst 142, which will be discussed in more detail below.

DEF introduced into the exhaust system 104 can tend to form a film that, if not suitably removed, can lead to unwanted deposit formation at various portions of the exhaust system 104. As noted above, the present disclosure relates to reduction or elimination of the unwanted DEF-based deposits in the exhaust system 104. In particular, embodiments of the disclosed subject matter can increase the rate of heat transferred to DEF on a surface, for instance, to increase a rate of boiling of the received DEF, by way of modification of the geometry of the DEF on the surface and/or by way of providing or facilitating elevated temperatures at the surface, to reduce (including reduce entirely) a volume of the DEF on the surface, ultimately to reduce or eliminate deposit formation.

Accordingly, one or more components, and more specifically exhaust components, of the exhaust system 104 can include a surface treatment in the form of a coating layer (or layers). The coating layer may be hereinafter interchangeably referred to as "washcoat" or "heat transferring structure," or "surface feature," without limiting the scope of the present disclosure. Further, the exhaust components of the exhaust system 104 may include, but are not limited to, the mixer conduit 110, the mixer 122, the first frusto-conical tube 148, and the substrate 601 (see FIGS. 6 and 7). Further, optionally, a mixer 122 may not be employed, but a corresponding conduit portion identified as receiving or likely to receive DEF may be provided with the coating layer. In various examples, the exhaust components may have metallic bodies.

Additionally, in one or more embodiments, the coating layer can include or be a textured or patterned surface, which may be created using a laser or 3-D printing, for instance, to micro-pattern or nano-pattern one or more surfaces, for instance. In this regard, the coating layer can be textured or patterned, for instance, to control movement of DEF on the surface. For example, the textured or patterned surface may be configured to control or direct the impacting DEF droplet to a known relatively hotter area of the textured or patterned surface or inner surface not covered by or part of the coating layer, or conversely, away from a relatively cooler area of the textured or patterned surface or inner surface not covered by or part of the coating layer. As another example, but optionally not with a mixer, the coating layer can be textured or patterned to increase the surface wettability as compared to the underlying exhaust surface without the coating layer. In other words, when an impacting DEF droplet contacts the coating layer, the constitution of the coating layer (material and/or geometry) can cause the impacting DEF droplet to spread out to form a thin film on the coating layer (see, e.g., FIG. 7 discussed below). In this regard, a thickness of the film so formed is less than a thickness of the impacting DEF droplet.

Figure 3:
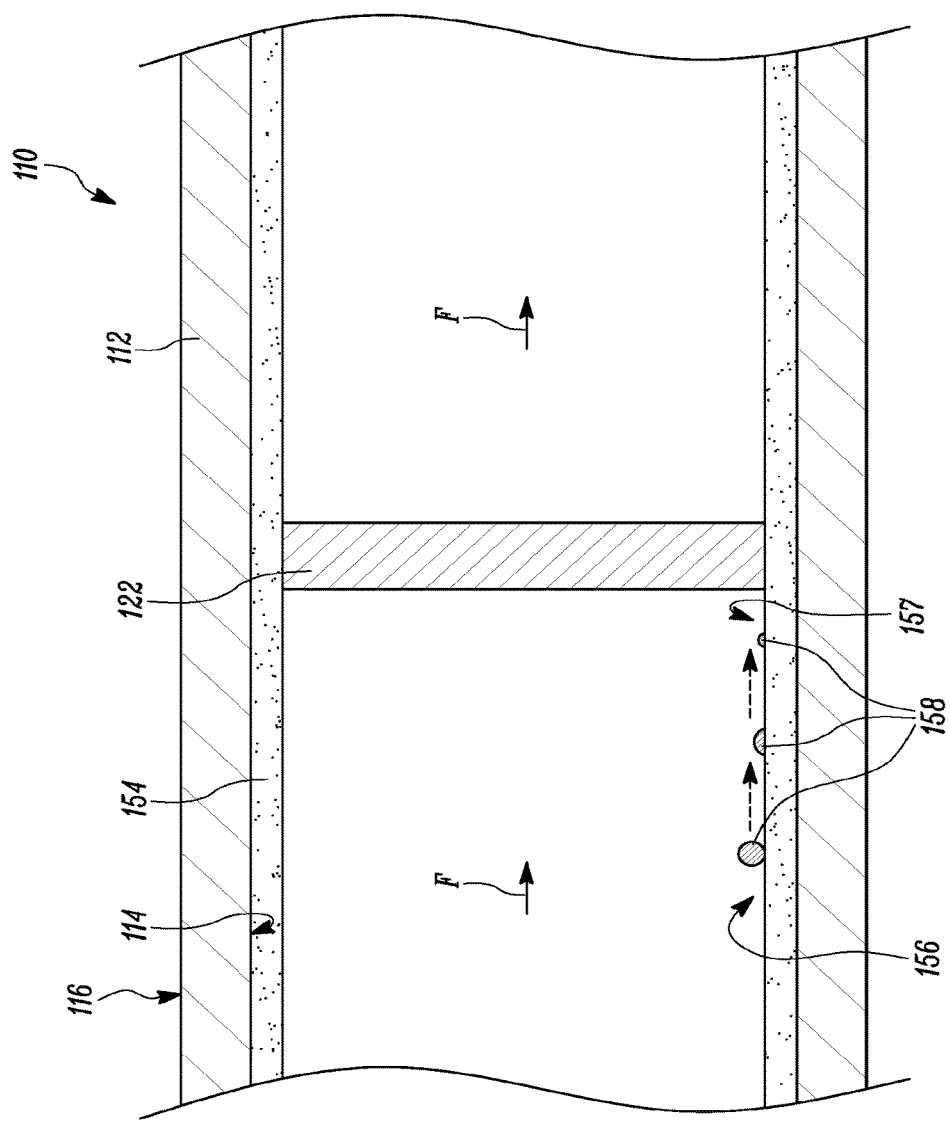
FIG. 3 is a cross-sectional view of a portion of a conduit of a diesel engine exhaust system according to one or more embodiments of the present disclosure.

Referring now to FIG. 3, the mixer conduit 110 can include a first coating layer 154. The first coating layer 154 can be disposed on a first pre-set area 156 of the inner surface 114 of the mixer conduit 110. In FIG. 3, the first pre-set area 156 is an entire area of the inner surface 114 of the mixer conduit 110. Further, the first pre-set area 156 can be disposed at a first predetermined location 157. The first predetermined location 157 may be defined at a location where droplets of the injected DEF are known or anticipated to impact the first coating layer 154. In this case, the impacting DEF droplets, which is represented diagrammatically in FIG. 3 initially as a DEF droplet 158 and its transition from an initial impact state (diagrammatically represented) to a reduced state (including entirely or substantially entirely reduced) due to the increased heat transfer properties, such as increased thermal conductivity, of the first coating layer 154, are received by the first coating layer directly from the DEF injection port 120.

The first coating layer 154 is made of a first material that is different from a material of the mixer conduit 110 on which the first coating layer 154 is disposed. The first coating layer 154 is made of a material that exhibits increased heat transfer properties, meaning, for instance, that the first coating layer 154 can provide a location on the surface with increased thermal conductivity or temperature (including increased heat transfer to or retention at the surface) as compared to the inner surface 114 of the mixer conduit 110 alone, and cause the droplets of DEF to change their geometry (e.g., reduction in volume due to increased evaporation, flattening out, entering channels/pores, transforming each DEF droplet into smaller DEF droplets, etc.) such that more surface area of the DEF droplets is exposed to the first coating layer 154 and the exhaust flow so as to increase the heat transfer rate and hence rate of boiling of the received DEF droplets. Thus, the first coating layer 154 is composed so as to facilitate water evaporation and urea thermolysis of the impacting DEF droplets 158.

In relation to FIG. 3, the DEF droplet 158 to the left represents an example of a DEF droplet upon initial or recent impact (diagrammatically shown) on the first coating layer 154. The DEF droplet 158 to the left may be pushed a bit downstream by the exhaust gas flow F, but in any event, whether the DEF droplet 158 moves or does not move, the rate of volume decrease can be accelerated (including reduced completely), such as represented by the DEF droplet portions 158 in FIG. 3 to the right of the left-most DEF droplet, based on the increased heat transfer properties of the first coating layer 154 as discussed herein that promote increased water evaporation and urea thermolysis. Further, though not expressly identified in FIG. 3, the DEF droplet 158 may be reduced completely or substantially completely, for instance, such that unwanted DEF-based deposits are not formed.

More particularly, the first coating layer 154 promotes water evaporation and urea thermolysis of the impacting DEF droplets 158 by increasing the heat transferred to the impacting DEF droplets 158. In one or more embodiments, heat from surrounding areas of the exhaust system 104 (including from inside the exhaust system) can be transferred to the first coating layer 154, and subsequently efficiently transferred to the impacting DEF droplets 158. Optionally, a localized heating element may be included to provide localized heat only at or to the mixer conduit 110 and/or the first coating layer 154. Additionally or alternatively, the first coating layer 154 can facilitate increased water evaporation and urea thermolysis of the impacting DEF droplets 158 by reducing a thickness of the impacting DEF droplets 158, and increasing the surface area of the DEF, for instance, to create a film of DEF, so as to place a greater surface area of the DEF into thermal contact with the first coating layer 154.

Optionally, the heat transfer to the deposited DEF can be performed without increasing a temperature of the exhaust gases. That is, optionally, the increased heat transfer properties of the first coating layer 154 are exhibited without an increase in temperature of the exhaust gases, for instance, using either a Continuous Regeneration System (CRS) or an in-cylinder injection of diesel fuel at the end of each combustion cycle. Indeed, in one or more embodiments of the disclosed subject matter, a CRS may not be provided in the vehicle, machine, or exhaust system.

Further, optionally, the first coating layer 154 may be embodied as a hydrophilic layer or a superhydrophilic layer, though not on a mixer configured to breakup DEF droplets, which can cause impacting DEF droplets 158 to spread across a surface of the mixer conduit 110 coated with the hydrophilic layer or superhydrophilic layer to make a relatively thin film of DEF. The thin film can evaporate faster than DEF droplets 158 that are not thinned into a relatively thin film or layer due to a greater surface area for heat transfer to the DEF. A thickness of the film so formed is less than a thickness of the impacting DEF droplets 158. Additionally or alternatively, in one or more embodiments the first coating layer 154 may be composed of a material having a relatively high surface energy, which can allow the impacting DEF droplets 158 to spread more easily.

The first coating layer 154 may be applied to the mixer conduit 110 by spraying, dipping in a slurry, or Chemical Vapor Deposition (CVD), for instance. The first coating layer 154 may be made of a material such as, but not limited to, a metal (e.g., copper, platinum, chromium, aluminum, titanium) or Metal Matrix Composite (MMC) or some other metallic or non-metallic composition capable of exhibiting the requisite increased heat transferring and/or hydrophilic/superhydrophilic properties, and that are able to withstand exhaust gases at elevated temperatures. Further, in one or more embodiments, the surface treatment of the inner surface 114, such as a coating layer, may be selectively applied to one or more of the exhaust components of the exhaust system 104.

Figure 4:
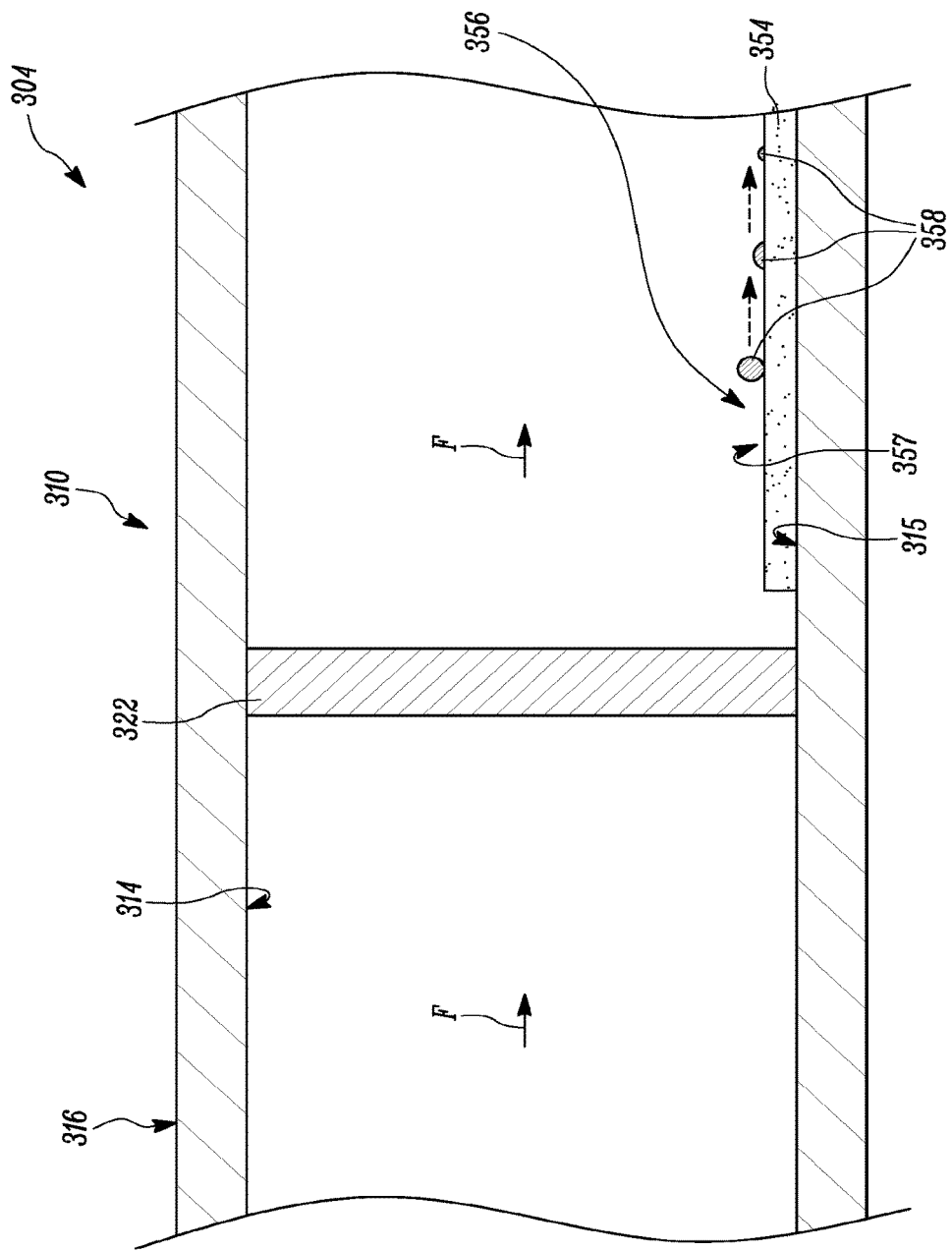
FIG. 4 is a cross-sectional view of a portion of a conduit of a diesel engine exhaust system according to one or more embodiments of the present disclosure.

FIG. 4 illustrates an exhaust system 304, according to one or more embodiments of the disclosed subject matter, which includes a mixer conduit 310, and that includes a selectively applied surface treatment having increased heat transfer properties, such as increased thermal conductivity, as described herein.

In particular, the exhaust system 304 can include a first coating layer 354, for instance, provided only on a bottom portion 315 of an inner surface 314 of the mixer conduit 310. The bottom portion 315 of the mixer conduit 310 can be provided downstream of a mixer 322, for instance, an impact mixer, with respect to an exhaust gas flow direction F. Thus, a first pre-set area 356 at which the first coating layer 354 is provided is the bottom portion 315 of the mixer conduit 310. In this example, an impacting DEF droplet 358 is anticipated to contact the first coating layer 354 at a first predetermined location 357, for instance, after transformation from a larger DEF droplet upon impacting the mixer 322. Thus, the first coating layer 354 receives the impacting DEF droplet(s) 358 from the mixer 322, indirectly relative to where the DEF was introduced to the exhaust system 304. The first predetermined location 357, in this example, is defined at the bottom portion 315 of the inner surface 314.

Similar to above, the DEF droplet 358 to the left represents an example of a DEF droplet upon initial or recent impact on the first coating layer 354. The DEF droplet 358 to the left may be pushed a bit downstream by the exhaust gas flow F, but in any event, whether the DEF droplet 358 moves or does not move, the rate of volume decrease can be accelerated (including reduced completely), such as represented by the DEF droplets 358 to the right in FIG. 4, based on the increased heat transfer properties of the first coating layer 354 as discussed herein that promote or enhance water evaporation and urea thermolysis. Further, though not expressly identified in FIG. 4, the DEF droplet 358 may be reduced completely or substantially completely, for instance, such that unwanted DEF-based deposits are not formed.

Figure 5:
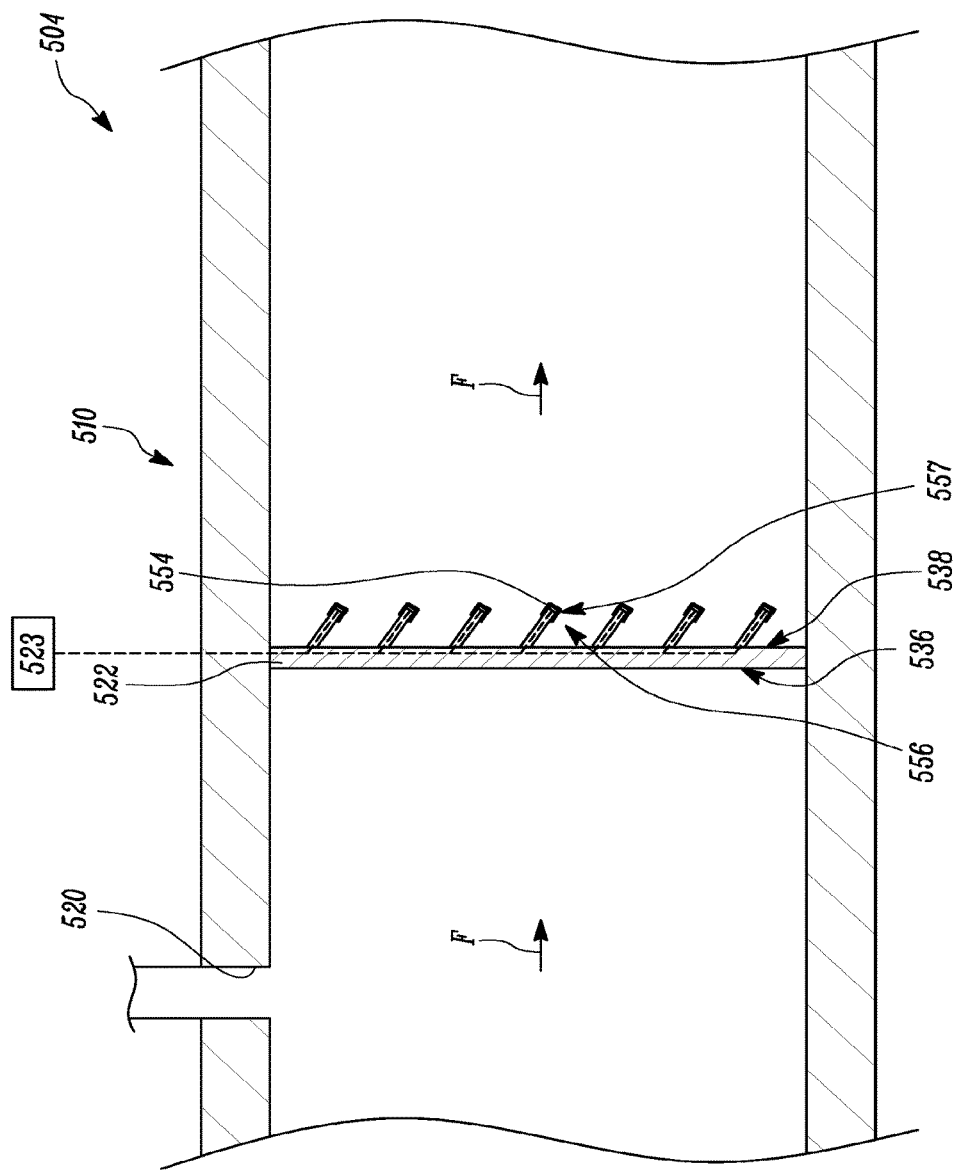
FIG. 5 is a cross-sectional view of a mixer conduit having a mixer with an increased heat transferring surface treatment, according to one or more embodiments of the present disclosure.

FIG. 5 illustrates a portion of an exhaust system 504 according to one or more embodiments of the present disclosure. In FIG. 5, a mixer 522 of exhaust system 504, which can be an impact mixer, is arranged in a mixer conduit 510. Generally, droplets of DEF can impact surfaces of the mixer 522, and the mixer 522 can make smaller droplets of the initial DEF droplets. Further, optionally, impacting DEF droplets can be received directly from a DEF injection port 520. Of course, not expressly illustrated in FIG. 5 (or the other figures), mixers according to embodiments of the disclosed subject matter can have openings that allow exhaust gases to pass in an exhaust gas flow path or substantially in the exhaust gas flow path (i.e., subject to the flow processing created by the mixer).

In an effort to prevent or lessen DEF droplets accumulating on surfaces of the mixer 522, such as at a flapper (e.g., a back surface of the flapper), the mixer 522 according to embodiments of the disclosed subject matter can include a second coating layer 554. Generally speaking, the second coating layer 554 can have increased heat transfer properties as described herein, for example, increased thermal conductivity, such that heat can be efficiently transferred from relatively hotter portions of the mixer 522 to relatively cooler portions of the mixer 522 (e.g., a back side or surface of a flapper or fin). More specifically, the second coating layer 554 can promote heat transferred thereto so as to increase a rate of boiling for any DEF at or adjacent to the second coating layer 554. That is, the second coating layer 554 can have properties that cause an increase in nucleate boiling of the DEF, such as reducing the size of bubbles that are formed (i.e., smaller bubbles can evaporate faster), efficient departure rate (i.e., faster departure rate), etc. Further, the second coating 554 may be less hydrophilic than an original or underlying mixer surface on which the second coating 554 is provided, for instance, to prevent or reduce DEF droplets sticking to the mixer 522. For example, to enhance nucleate boiling, functionalized multiwall carbon nanotubes may be used.

The mixer 522 can have a front surface 536 and a rear surface 538. The mixer 522 can also include a flapper portion, for instance, with a plurality of angled "fins" or "vanes." The second coating layer 554 can be disposed on a second pre-set area 556 the mixer 522. Further, the second pre-set area 556 at which the second coating layer 554 is disposed can be at a second predetermined location 557. The second predetermined location 557 may be defined at a location where droplets of injected DEF are anticipated or known to impact or otherwise come into contact with the second coating layer 554. FIG. 5, for instance, illustrates the second coating layer 554 being provided at an outlet side of the mixer 522, as distinct coating portions at downstream ends of fins or vanes of a flapper. Though FIG. 5 shows the second coating layer 554 on top, bottom and end surfaces of the fins/vanes, the second coating layer 554 may be provided only on the top surface at the end, only on the end surface, or only on the top and end surfaces according to embodiments of the disclosed subject matter.

Thus, locations on the surfaces of the mixer may be provided with the second coating layer 554, where DEF droplets that stick to the mixer are known to accumulate.

Alternatively, only surfaces facing the flow of exhaust gas may be provided with the second coating layer 554, since such surfaces may be more likely to be impacted by DEF droplets as compared to surfaces not facing the exhaust gas flow. For example, surfaces at an outlet side of the mixer 522 may be provided with the second coating layer 554. Alternatively, all surfaces of the mixer (or portions thereof) may be provided with the second coating layer 554.

The second coating layer 554 can be composed so as to facilitate increased water evaporation and urea thermolysis of accumulating DEF droplets. More particularly, the second coating layer 554 can facilitate water evaporation and urea thermolysis of impacting DEF droplets that accumulate by transferring heat to the impacting DEF droplets (which can include moving the DEF droplets to a greater source of heat). For example, the second coating layer 554 can receive heat from surrounding areas of the exhaust system 504 to transfer heat to the impacting DEF droplets. Optionally, a localized heat source 523 may be provided, which can provide increased heat to select portions of the mixer 522, for instance, those portions having the second coating layer, such as the fins/vanes of a flapper, or even only the ends of the fins/vanes of the flapper.

The second coating layer 554 can be made of a second material that is different than a material of the front surface 536 and/or rear surface 538 of the mixer 522. Further, a technique of applying the second coating layer 554 may be similar to or the same as the technique of applying the first coating layer 154 as explained earlier.

Figure 6:
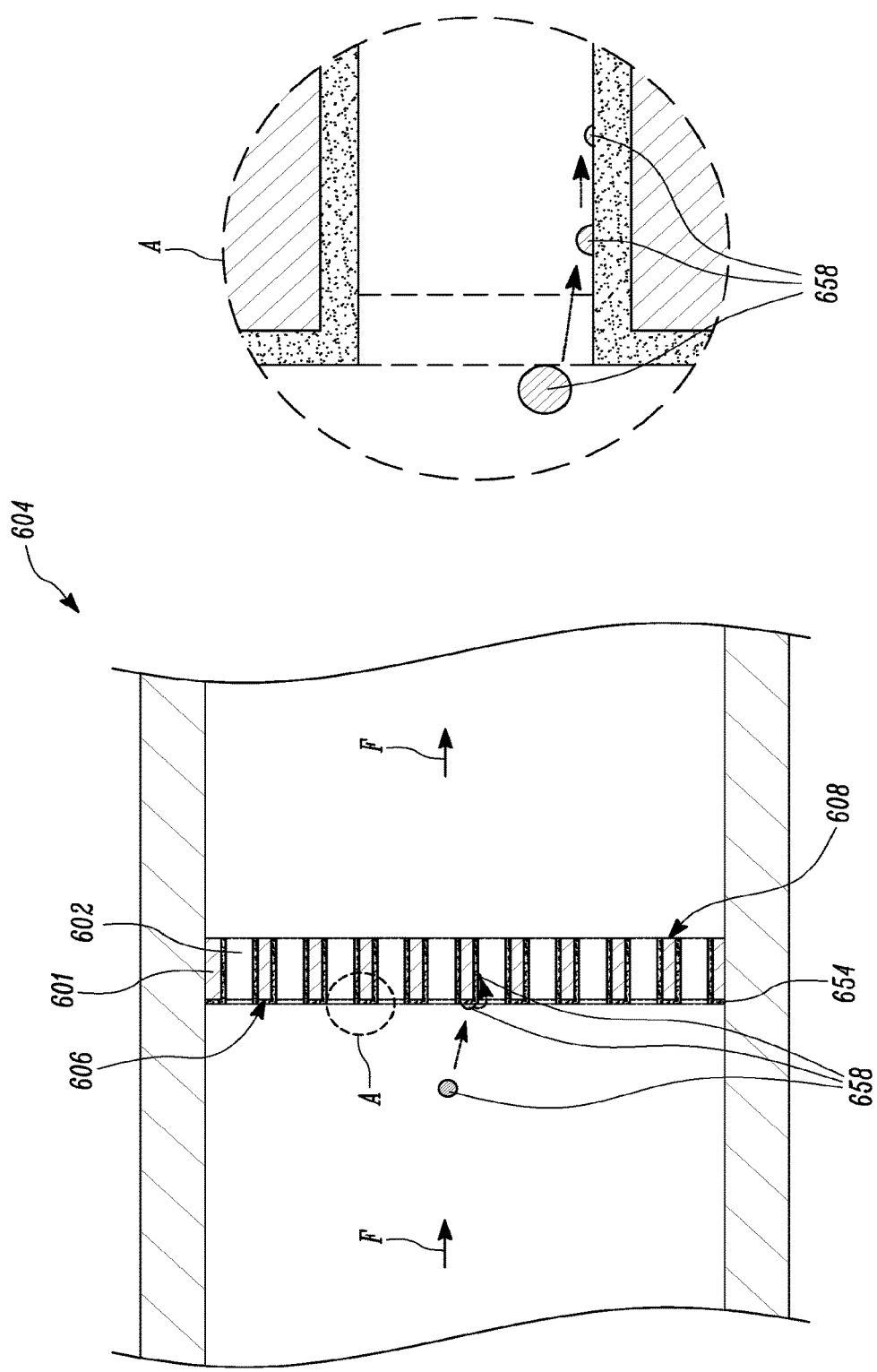
FIG. 6 is a cross-sectional view of an example of a substrate associated with a diesel engine exhaust system with an increased heat transferring surface treatment provided, according to one or more embodiments of the present disclosure.

Referring now to FIG. 6, this figure shows a diagrammatic view of a substrate 601 provided in a conduit portion of an exhaust system 604, which, according to one or more embodiments of the disclosed subject matter, may replace a hydrolysis catalyst 142. The substrate 601 includes a number of pores or channels 602 (diagrammatically illustrated) extending, for instance, axially from a first side 606 of the substrate 601 to a second side 608 of the substrate 601. Further, the substrate 601 can be in the form of a honeycomb, foam, or a woven wire, for instance. Additionally, the substrate 601 can be metallic, for instance, with a relatively lower thermal mass and higher thermal conductivity as compared to cordierite, for instance. The substrate 601 can receive exhaust gases and DEF according to an exhaust gas flow direction 'F.' Optionally, DEF may be sprayed directly on substrate 601.

The substrate 601 can include thereon (including therein, on the surfaces of the pores 602) a third coating layer 654. The third coating layer 654 can be provided on the first side 606 of the substrate 601. In FIG. 6, the third coating layer 654 is disposed on the first side 606 of the substrate 601 and along the inner surfaces defining the pores 602. Alternatively, the third coating layer 654 may be provided on select portions of the first side 606 and/or the pores 602, where DEF droplets are anticipated or known to contact the first side 606 of the substrate 601.

As DEF droplets (represented diagrammatically by DEF droplet 658) contact the third coating layer 654, the increased heat transfer to the DEF droplets as described herein can be provided by the third coating layer 654 such that the DEF droplets are reduced in volume as described above relative to coating layers of one or more of the other described embodiments. Optionally, the number of cells per square inch (cpsi) of the pores 602 of the substrate 601 can be increased to increase the rate of heat transfer to the surfaces of the pores and thus to the DEF droplets. Additionally, the material from which the substrate 601 is made can provide increased thermal conductivity to transfer heat through the substrate 601 to any known or anticipated relatively colder spots.

Figure 7:
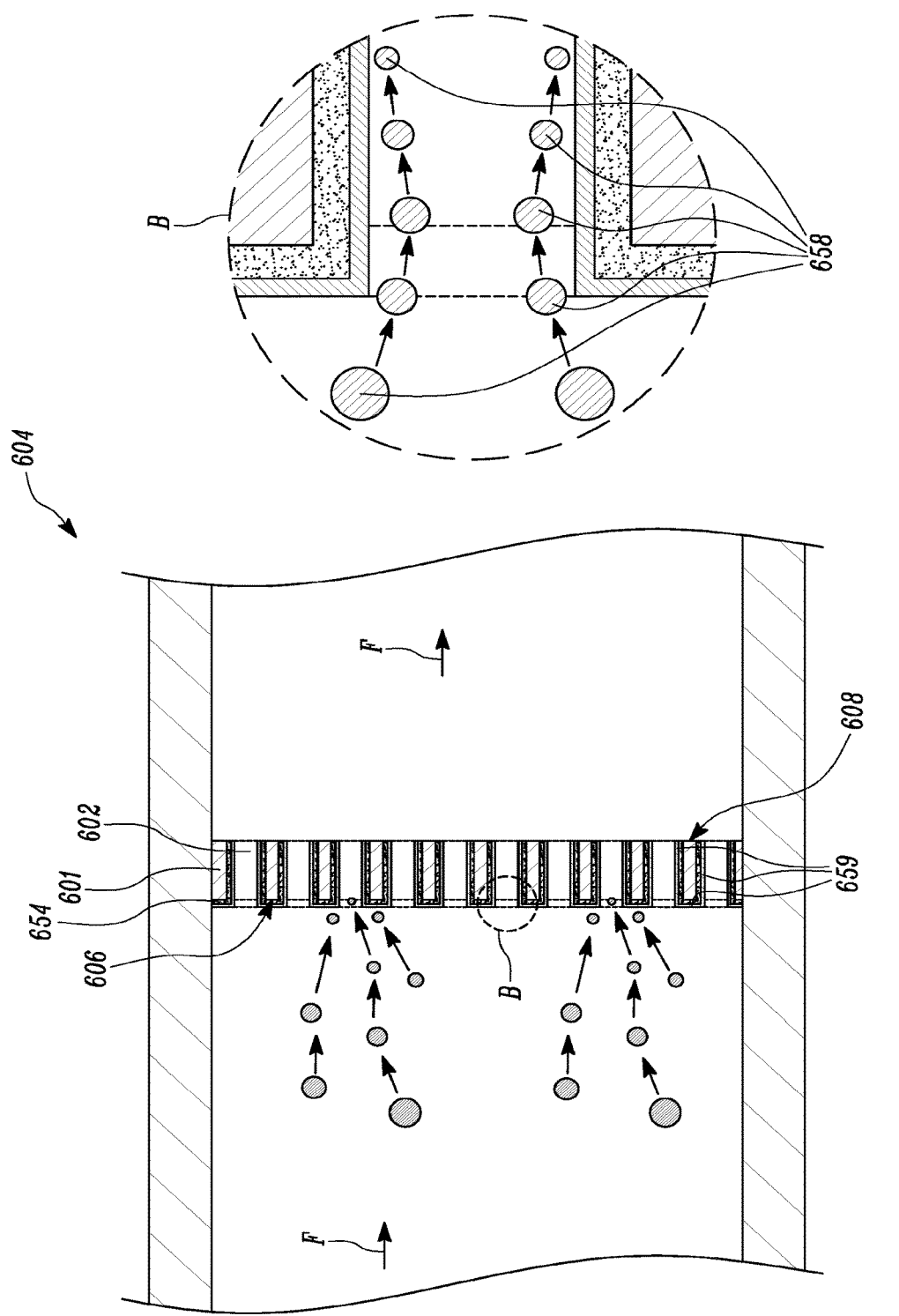
FIG. 7 is a cross-sectional view of an example of a substrate associated with a diesel engine exhaust system with an increased heat transferring surface treatment provided to cause impacting DEF droplets to form a thin film, according to one or more embodiments of the present disclosure.

Optionally, the third coating layer 654 may embody a hydrophilic substrate or a superhydrophilic layer. Further, the third coating layer 654 may include a textured or patterned surface that controls movement and/or provides an increased surface wettability as compared to the underlying surface without the third coating layer 654. FIG. 7, for instance, illustrates the third coating layer 654, which may be a hydrophilic substrate or a superhydrophilic layer or otherwise control movement of impacting DEF droplets, causing impacting DEF droplets to spread out and form a thin film 659 (or thin film portions depending upon when and where DEF droplets impact), which has a thickness less than a thickness of the impacting DEF droplet or droplets, for instance, on the uncoated surface. Thus, each impacting DEF droplet can be transformed to a thin film on the surfaces of the substrate 601.

As noted above, in one or more embodiments of the present disclosure, the first coating layer 154, 354, the second coating layer 554, and the third coating layer 654 may be embodied as surface modifications that can increase heat transfer properties, such as increased thermal conductivity, regarding heat transferred to areas where DEF droplets impact or tend to gather.

INDUSTRIAL APPLICABILITY

The present disclosure relates to the provision of providing, including selectively providing, coating layers 154, 354, 554, 654 on one or more exhaust components of a diesel exhaust system, such as exhaust systems 104, 304, 504, 604, where the DEF droplets impact, tend to gather, or where DEF deposits are likely or known to occur. Surface treatments, such as coating layers 154, 354, 554, 654, can have heat transferring capabilities that increase an amount of heat transferred to DEF droplets impacting the surface treatment. Such heat transfer can increase the rate of water evaporation and urea thermolysis, which can cause DEF droplets to evaporate rather than pool into larger drops, thereby reducing the time that each urea molecule is present in the exhaust gases. Reducing the observed rate of urea reacting with HNCO or other urea molecules to form deposits can reduce, minimize, or eliminate the risk of DEF-based deposit formation in the exhaust system 104, 304, 504, 604.

In an example, the material of the coating layers 154, 354, 554, 654 can cause the coating layers 154, 354, 554, 654 to provide an increased rate of heat transfer at or to a particular surface area where DEF droplets impact or typically impact. In another example, the material of the coating layers 154, 354, 654 may be hydrophilic or superhydrophilic, which can cause DEF droplets to spread across the coating layers 154, 354, 654 to make a thin film layer. Further, the material of the coating layers 154, 354, 654 may have a relatively high surface energy, which can allow DEF droplets to spread more easily. In one or more embodiments, one or more coating layers 154, 354, 554, 654 may include a textured or patterned surface to improve/promote heat transfer to impacting DEF droplets 158, 358, 558, 658.

The coating layers 154, 354, 554, 654 may be disposed on one or more exhaust components during assembly of the exhaust system 104, 304, 504, 604. Alternatively, a process of applying the coating layers 154, 354, 554, 654 may be implemented as a retrofit, after the exhaust system 104, 304, 504, 604 has been assembled and put in operation. For example, an exhaust component having a surface treatment, such as a coating layer as described herein, may replace an existing exhaust component that does not have the surface treatment.

The provision of the coating layers 154, 354, 554, 654 can lower fuel consumption by reducing thermal management requirements and improve overall cell averaged $NO_x$ cycle conversion. Further, the provision of the coating layers 154, 354, 554, 654 can reduce or eliminate urea deposits in the exhaust system 104, 304, 504, 604, and consequently other byproducts having relatively higher decomposition temperatures, that may otherwise reduce fuel efficiency, cause filters to fail, damage the SCR catalyst, cause excessive back pressure, and adversely impact DEF dosing control, for instance.

Figure 8:
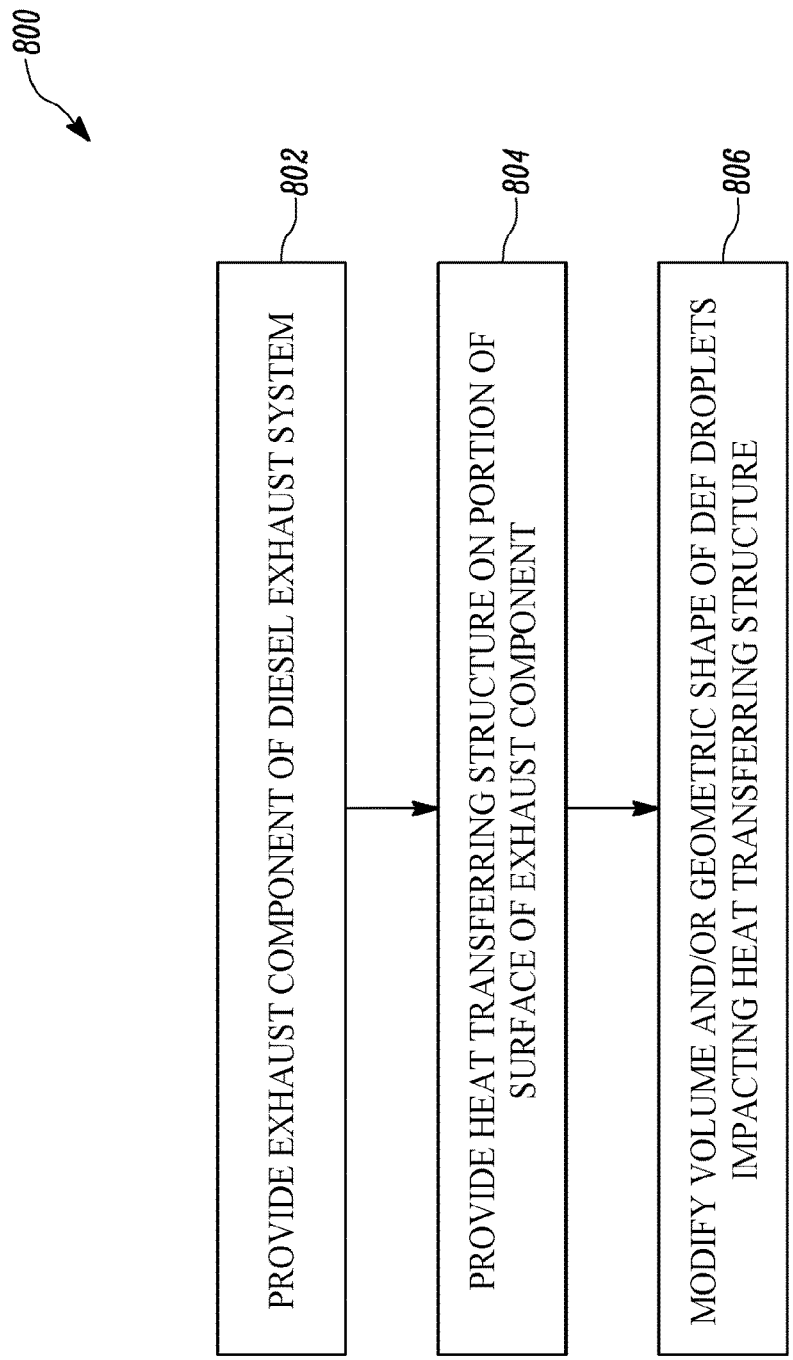
FIG. 8 is a general flowchart for a method according to one or more embodiments of the present disclosure.

Referring now to FIG. 8, FIG. 8 illustrates a flowchart for a method 800 to address unwanted deposits in a diesel exhaust system, such as DEF-based deposits in the exhaust system 104, 304, 404, 504, 604. Put another way, method 800 can reduce the volume and/or modify the geometric shape of deposited DEF droplets, by way of directed heat to the deposited DEF droplets, ultimately to reduce or eliminate unwanted DEF-based deposits in a diesel exhaust system.

At step 802, an exhaust component can be provided, and at step 804 an increased heat transferring surface structure, such as a coating layer, surface geometry, surface treatment, etc., may be provided. Further, step 802 can include providing a plurality of exhaust components, which may be the same or different. Step 804 can include providing one or more heat transferring structures, either to a same provided exhaust component or different provided exhaust components.

As discussed above, the heat transferring structure may be provided on the exhaust component when the exhaust component is manufactured (i.e., essentially at the same time), the heat transferring structure may be provided on the exhaust component after the exhaust component is created, but before installation in an exhaust system, the heat transferring element may be provided on the exhaust component with the exhaust component installed or substantially installed in the exhaust system, or the heat transferring element may be provided on the exhaust component as a retro-fit, after the exhaust component has been in operation. Further, the heat transferring element according to one or more embodiments of the disclosed subject matter may be applied or provided on or to the exhaust component by spraying, dipping in a slurry, or Chemical Vapor Deposition (CVD), for instance. An example of an exhaust component is a mixer, such as described herein, an exhaust conduit portion, such as mixer conduit as described herein, and/or a substrate, such as described herein.

At 806, the diesel engine can be operating, DEF can be injected into the exhaust system, and DEF droplets can impact one or more heat transferring structures provided in step 804. The one or more heat transferring structures can reduce the volume and/or modify the geometric shape of the DEF droplets by providing increased heat transfer to the DEF droplets or film, such as described herein. Such modification can result in reducing or eliminating unwanted DEF-based deposits in a diesel exhaust system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An exhaust system for a diesel engine comprising:
   a mixer conduit having a body with an inner surface and an outer surface;
   a mixer arranged inside the mixer conduit having a front surface and a rear surface;
   a Diesel Exhaust Fluid (DEF) injection port configured to inject DEF into the mixer conduit upstream of the mixer with respect to an exhaust gas flow direction;
   a first coating layer disposed on a first pre-set area of the inner surface of the mixer conduit, the first coating layer being of a material different from a material of the inner surface of the mixer conduit; and
   control circuitry configured to control DEF injection,
   wherein the mixer conduit is configured to receive exhaust gases from the diesel engine and DEF from the DEF injection port,
   wherein the first pre-set area of the inner surface is disposed at a first predetermined location where droplets of injected DEF are anticipated to impact the first coating layer,
   wherein the first coating layer is composed so as to facilitate water evaporation and urea thermolysis of an impacting DEF droplet, and
   wherein the water evaporation and urea thermolysis is performed without the control circuitry causing an increase in exhaust temperature at the first predetermined location.

2. The exhaust system of claim 1, wherein the first predetermined location of the inner surface of the mixer conduit is downstream of the mixer with respect to the exhaust gas flow direction.

3. The exhaust system of claim 1, wherein the first pre-set area of the inner surface of the mixer conduit is an entire area of the inner surface.

4. The exhaust system of claim 1, wherein the impacting DEF droplet is received from the mixer.

5. The exhaust system of claim 1, wherein the impacting DEF droplet is received directly from the DEF injection port.

6. The exhaust system of claim 1, further comprising a localized heat source to locally increase a temperature only at the first pre-set area.

7. The exhaust system of claim 1, wherein the first coating layer is patterned or textured to control movement of the impacting DEF droplet.

8. The exhaust system of claim 7, wherein the first coating layer is patterned or textured to provide a surface with a wettability greater than a wettability of the inner surface of the mixer conduit.

9. The exhaust system of claim 1, further comprising:
   a second coating layer disposed on a second pre-set area of the front surface of the mixer,
   wherein the second coating layer is composed so as to facilitate water evaporation and urea thermolysis of an impacting DEF droplet, and
   wherein the second pre-set area of the surface of the mixer is disposed at a second predetermined location where droplets of injected DEF are anticipated to impact or accumulate at the second coating layer.

10. The exhaust system of claim 9, wherein the surface of the second pre-set area of the surface of the mixer is at an outlet of the mixer.

11. A method for transferring heat to an aqueous urea solution in a diesel exhaust system, comprising:

providing an exhaust component of the diesel exhaust system, the exhaust component having a surface configured to contact exhaust gas flowing in the diesel exhaust system and an aqueous urea solution introduced into the diesel exhaust system; and providing a heat transferring structure on a portion of the surface of the exhaust component, the heat transferring structure being configured to receive a portion of the aqueous urea solution introduced into the diesel exhaust system;

wherein the heat transferring structure facilitates heat transfer to the portion of the aqueous urea solution to promote water evaporation and urea thermolysis of the received portion of the aqueous urea solution;

wherein the exhaust component is a substrate having a plurality of channels or pores running from a first side to a second side thereof;

wherein the heat transferring structure is at least one of a superhydrophilic material coating disposed on the surface of the substrate, on walls of the channels or pores, and a superhydrophilic pattern created on the walls of the channels or pores of the substrate; and wherein the method further comprises receiving, at the first side of the substrate, the portion of the aqueous urea solution introduced into the diesel exhaust system directly from an aqueous urea solution inlet port, the portion of the aqueous urea solution introduced into the diesel system being substantially all of the aqueous urea solution introduced into the diesel exhaust system per injection.

12. The method of claim 11, wherein said providing the heat transferring structure is after said providing the exhaust component.

13. The method of claim 11, further comprising:

simultaneously providing the exhaust gas and the aqueous urea solution to the exhaust gas component;

receiving at the heat transferring structure the portion of the aqueous urea solution introduced into the diesel exhaust system; and facilitating, by the heat transferring structure, heat transfer to the portion of the aqueous urea solution, said facilitating heat transfer to the portion of the aqueous urea solution including increasing a surface area of the portion of the aqueous urea solution to which heat is transferred by the heat transferring structure and exhaust gas, as compared to a surface area of the portion of the aqueous urea solution upon preliminary contact with the heat transferring structure.

* * * * *